United States Patent
Onohara et al.

(10) Patent No.: US 11,124,150 B2
(45) Date of Patent: Sep. 21, 2021

(54) AIR BAG DEVICE

(71) Applicant: JOYSON SAFETY SYSTEMS JAPAN K.K., Tokyo (JP)

(72) Inventors: Keisuke Onohara, Shiga (JP); Hiroki Takehara, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 16/652,539

(22) PCT Filed: Oct. 9, 2018

(86) PCT No.: PCT/JP2018/037572
§ 371 (c)(1),
(2) Date: Mar. 31, 2020

(87) PCT Pub. No.: WO2019/093044
PCT Pub. Date: May 16, 2019

(65) Prior Publication Data
US 2020/0317156 A1    Oct. 8, 2020

(30) Foreign Application Priority Data

Nov. 8, 2017 (JP) .............................. JP2017-215655

(51) Int. Cl.
| | | |
|---|---|---|
| *B60R 21/261* | (2011.01) | |
| *B60R 21/217* | (2011.01) | |
| *B60R 21/235* | (2006.01) | |

(52) U.S. Cl.
CPC .......... *B60R 21/261* (2013.01); *B60R 21/217* (2013.01); *B60R 21/235* (2013.01);
(Continued)

(58) Field of Classification Search
CPC ...................... B60R 21/261; B60R 2021/2612
See application file for complete search history.

(56) References Cited

U.S. PATENT DOCUMENTS

| | | |
|---|---|---|
| 4,902,036 A | 2/1990 | Zander et al. |
| 5,172,934 A | 12/1992 | Frantz et al. |
| (Continued) | | |

FOREIGN PATENT DOCUMENTS

| | | |
|---|---|---|
| DE | 201 04 044 U1 | 7/2001 |
| DE | 103 49 458 A1 | 6/2005 |
| (Continued) | | |

OTHER PUBLICATIONS

International Searching Authority, "International Search Report," issued in connection with International Patent Application No. PCT/JP2018/037572, dated Dec. 4, 2018.
(Continued)

*Primary Examiner* — Nicole T Verley
(74) *Attorney, Agent, or Firm* — Foley & Lardner LLP

(57) ABSTRACT

An air bag 2, an inflator 3, and a diffuser 30 are attached to a retainer 10. The diffuser 30 has a main surface portion 31, leg piece portions 32 extending in four radiating directions, and flap portions 34. The main surface portion 31 covers a head side of the inflator 3. The leg piece portion 32 passes through a mounting ring 20 and an inflator opening 12 and passes between the retainer 10 and a flange portion 3b of the inflator 3. A bolt 21 of the mounting ring 20 is inserted through a small hole 33 of the leg piece portion 32.

11 Claims, 6 Drawing Sheets

(52) U.S. Cl.
CPC ............... *B60R 2021/23514* (2013.01); *B60R 2021/23538* (2013.01); *B60R 2021/2612* (2013.01)

(56) References Cited

U.S. PATENT DOCUMENTS

| | | | | |
|---|---|---|---|---|
| 5,836,608 A * | 11/1998 | Soderquist | ............ | B60R 21/261 280/728.2 |
| 5,992,874 A | 11/1999 | Sugiyama et al. | | |
| 6,042,147 A * | 3/2000 | Nishijima | ............ | B60R 21/217 280/731 |
| 6,089,600 A * | 7/2000 | Schenck | ............ | B60R 21/261 280/740 |
| 6,142,519 A | 11/2000 | Smith | | |
| 6,345,841 B2 | 2/2002 | Igawa et al. | | |
| 6,676,155 B2 | 1/2004 | Grosch et al. | | |
| 6,679,518 B2 | 1/2004 | Varcus et al. | | |
| 6,877,765 B2 * | 4/2005 | Rose | ............ | B60R 21/217 280/728.2 |
| 7,445,238 B2 * | 11/2008 | Marriott | ............ | B60R 21/217 280/729 |
| 8,104,792 B2 * | 1/2012 | Taniyama | ............ | B60R 21/201 280/743.1 |
| 9,555,764 B2 | 1/2017 | Hiruta et al. | | |
| 9,682,679 B2 * | 6/2017 | Hatfield | ............ | B60R 21/217 |
| 2002/0079678 A1 | 6/2002 | Kai et al. | | |
| 2002/0125704 A1 | 9/2002 | Heindl | | |
| 2005/0087967 A1 * | 4/2005 | DePottey | ............ | B60R 21/261 280/740 |
| 2006/0249932 A1 * | 11/2006 | Marriott | ............ | B60R 21/217 280/729 |
| 2007/0222194 A1 | 9/2007 | Harvey et al. | | |
| 2007/0222196 A1 * | 9/2007 | Harvey | ............ | B60R 21/2346 280/740 |
| 2008/0265550 A1 | 10/2008 | Lisseman et al. | | |
| 2009/0033072 A1 * | 2/2009 | Lisseman | ............ | B60R 21/261 280/728.2 |
| 2016/0167615 A1 * | 6/2016 | Hiruta | ............ | B60R 21/2342 280/739 |
| 2017/0313275 A1 | 11/2017 | Eck et al. | | |
| 2017/0369021 A1 | 12/2017 | Kienzner et al. | | |
| 2018/0312128 A1 | 11/2018 | Von Roden et al. | | |
| 2019/0389417 A1 | 12/2019 | Von Roden et al. | | |

FOREIGN PATENT DOCUMENTS

| | | | | |
|---|---|---|---|---|
| DE | 10 2007 013 816 A1 | 1/2008 | | |
| DE | 10 2006 041 145 A1 | 3/2008 | | |
| DE | 20 2008 013 900 U1 | 12/2009 | | |
| DE | 10 2009 006 077 A1 | 7/2010 | | |
| DE | 102010008513 A1 * | 8/2011 | ............ | B60R 21/217 |
| DE | 20 2014 008 432 U1 | 1/2016 | | |
| EP | 1 074 435 B1 | 10/2004 | | |
| EP | 2 006 168 B1 | 1/2013 | | |
| EP | 3243709 A1 * | 11/2017 | ............ | B60R 21/274 |
| JP | H02-24242 A | 1/1990 | | |
| JP | H09-86323 A | 3/1997 | | |
| JP | 2000043666 A * | 2/2000 | | |
| JP | 2001-080448 A | 3/2001 | | |
| JP | 2002-114121 A | 4/2002 | | |
| JP | 2008-030568 A | 2/2008 | | |
| JP | 2013-244904 A | 12/2013 | | |
| JP | 2014-231313 A | 12/2014 | | |
| JP | 2016-112996 A | 6/2016 | | |
| JP | 6434699 B2 * | 12/2018 | | |
| KR | 100599573 B1 | 7/2006 | | |
| WO | WO-2013/179844 A1 | 12/2013 | | |

OTHER PUBLICATIONS

International Searching Authority, "Written Opinion," issued in connection with International Patent Application No. PCT/JP2018/037572, dated Dec. 4, 2018.

* cited by examiner

AIR BAG DEVICE

CROSS-REFERENCE TO RELATED APPLICATIONS

The present application claims priority under 37 U.S.C. § 371 to International Patent Application No. PCT/JP2018/037572, filed Oct. 9, 2018, which claims priority to and the benefit of Japanese Patent Application No. 2017-215655, filed on Nov. 8, 2017. The contents of these applications are hereby incorporated by reference in their entireties.

TECHNICAL FIELD

The present invention relates to an air bag device provided in a vehicle, and more particularly to an air bag device having a diffuser for directing gas from an inflator in a radial direction.

BACKGROUND ART

As an air bag device for a driver's seat, a device including an air bag, an inflator for inflating the air bag, a retainer to which the air bag and the inflator are attached, and a module cover for covering the air bag is widely used.

As described in Patent Literature 1, the air bag and the inflator are attached to the retainer via a mounting ring provided with stud bolts. A plurality of bolt insertion small holes are provided around inflator openings of the air bag and the retainer. The mounting ring is disposed in the air bag, and the stud bolt is passed through each of the bolt insertion small holes in the air bag, the retainer, and the flange portion of the inflator and then tightened by a nut, so that the air bag and the inflator are attached to the retainer.

Patent Literature 1 discloses that a cloth diffuser is provided for guiding gas ejected from an inflator in a radial direction. The entire diffuser of Patent Literature 1 is arranged in an air bag. This diffuser has many bolt insertion holes. A stud bolt of a mounting ring is inserted into each bolt insertion hole of the diffuser, the air bag, a retainer, and a flange portion of the inflator. Therefore, in Patent Literature 1, it is difficult to attach the diffuser to the retainer and it takes time to assemble the air bag device.

Patent Literature 2 discloses that a closed cylindrical cap for guiding gas from an inflator in a radial direction is disposed in an air bag. The cap is attached to a retainer together with an inflator by a bolt passing through the center of the cap. The structure of Patent Literature 2 cannot be applied when the inflator is a disk type. Patent Literatures 3 and 4 disclose that a dome-shaped diffuser or bag ring is provided. Patent Literatures 5 and 6 disclose that a retainer is provided with a portion having the same shape.

CITATION LIST

Patent Literature

[Patent Literature 1]: JP-A-2016-112996
[Patent Literature 2]: JP-A-2001-80448
[Patent Literature 3]: US Patent Publication No. 2009/33072
[Patent Literature 4]: JP-A-2013-244904
[Patent Literature 5]: US Patent Publication No. 2008/265550
[Patent Literature 6]: JP-A-2002-114121

SUMMARY OF INVENTION

An object of the invention is to provide an air bag device which can easily assemble a diffuser to a retainer.

According to one aspect of the present invention, there is provided an air bag device which includes
an air bag,
an inflator configured to inflate the air bag,
a retainer to which the air bag and the inflator are attached by a mounting ring,
a diffuser configured to regulate a gas flow direction from the inflator, and
a module cover covering the air bag, in which
the air bag and the retainer respectively has an inflator opening into which the inflator is inserted,
the mounting ring goes around the inflator opening in the air bag,
the mounting ring includes a plurality of bolts erected at intervals in a circumferential direction,
each bolt is inserted into bolt insertion holes provided on the air bag, the retainer, and the flange of the inflator, and a nut is screwed on the bolt,
the diffuser has a main surface portion covering the inflator, a plurality of leg piece portions extending from the main surface portion, and a bolt insertion small hole provided in the leg piece portion,
the leg piece portion extends outside the air bag through the inflator opening of the retainer, and is interposed between the flange portion of the inflator and the retainer, and
the bolt is inserted through the bolt insertion small hole.

In another aspect of the invention, the diffuser does not include a gas passage opening.

In still another aspect of the invention, the plurality of leg piece portions include four leg piece portions which extend from the main surface portion in four radiating directions.

In further another aspect of the invention, the diffuser has a flap portion protruding from the main surface portion between the leg piece portions.

In further still another aspect of the invention, a tip end of the flap portion reaches the inflator opening of the retainer.

In further still another aspect of the invention, the flap portion is in contact with a gas outlet of the inflator.

In further still another aspect of the invention, the flap portion protrudes to a lateral side when the inflator performs a gas ejection operation.

In further still another aspect of the invention, the diffuser is obtained by suturing a plurality of base fabrics.

In further still another aspect of the invention, the diffuser is obtained by laminating two base fabrics each having a heat-resistant coating on one surface, with the other non-coated surfaces facing each other.

In further still another aspect of the invention, the main surface portions of the diffuser are stitched together by an annular seam.

In further still another aspect of the invention, the diffuser is formed of a single base fabric with a heat-resistant coating on both sides.

Advantageous Effects of Invention

In the air bag device of the present invention, the leg portions of the diffuser engage the stud bolts of the mounting ring on the outer surface side of the retainer and the main body portion of the diffuser is inserted into the air bag through the retainer and the inflator opening of the air bag. Therefore, the diffuser can be assembled on the outer surface side of the retainer after the air bag is fixed to the retainer by the mounting ring, and thus the diffuser can be easily assembled.

DESCRIPTION OF EMBODIMENTS

Figure 1:
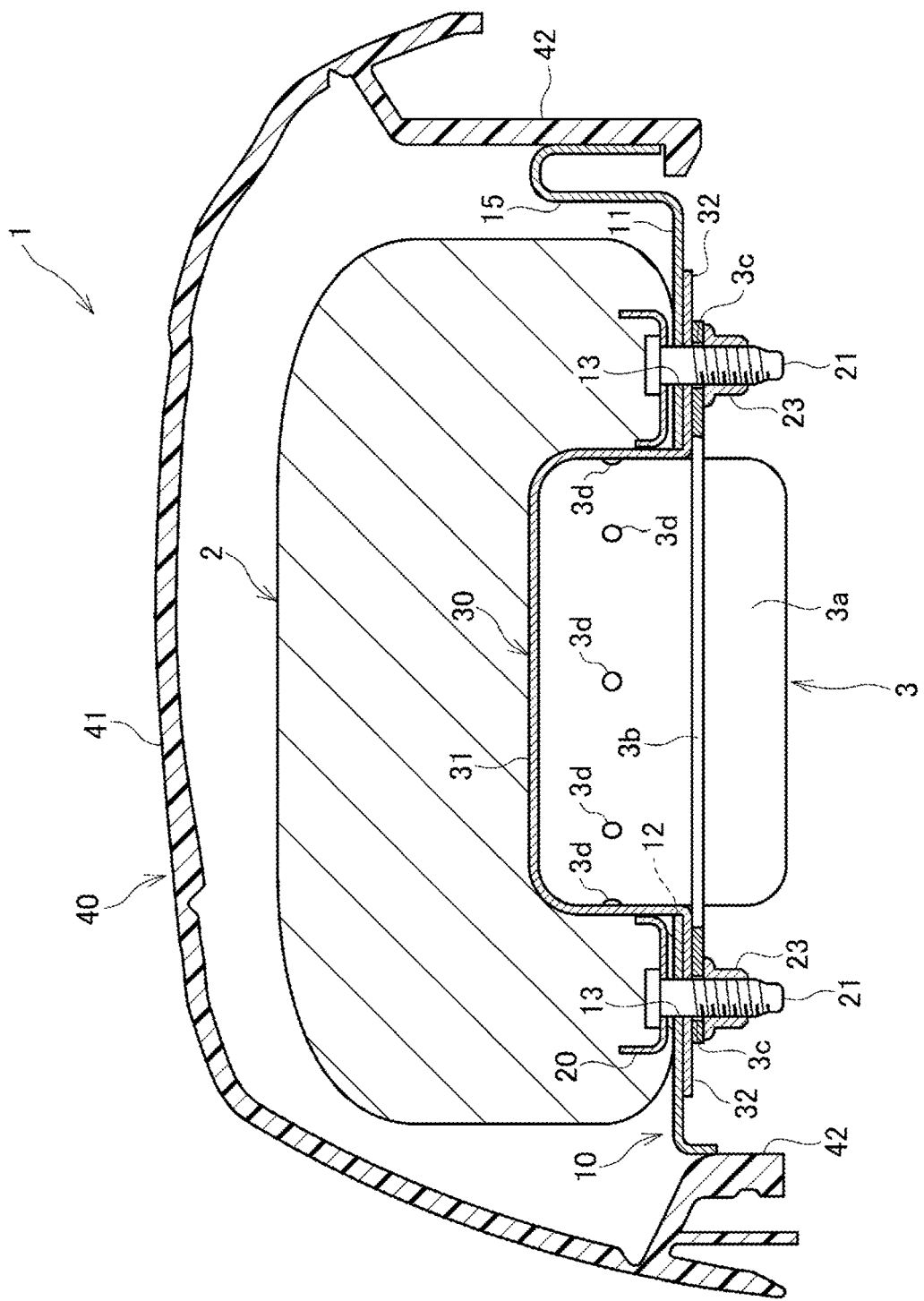
FIG. 1 is a cross-sectional view of an air bag device according to an embodiment.

Hereinafter, an embodiment of the invention will be described with reference to the drawings. In the following description, a 12 o'clock side and a 6 o'clock side of an air bag device for a driver's seat show an upper side and a lower side when a steering wheel is viewed from (from an occupant side extension direction of a steering shaft) the front and a 3 o'clock side shows a right side, and further a 9 o'clock side shows a left side. FIG. 1 shows a cross section of the air bag device for the driver's seat in a direction of 1:30-7:30.

An air bag device 1 includes a folded air bag 2, an inflator 3 for inflating the air bag 2, a retainer 10 to which the air bag 2 and the inflator 3 are attached, a mounting ring 20 for mounting the air bag 2 and the inflator 3 to the retainer 10, a diffuser 30 for regulating a gas flow direction from the inflator 3, a module cover 40 attached to an occupant side of the retainer 10 so as to cover the folded body of the air bag 2, and the like. The retainer 10 is made of a metal such as iron and the module cover 40 is made of a synthetic resin. The air bag 2 and the diffuser 30 are made of cloth.

The disc-type inflator 3 includes a disk-shaped main body portion 3a, a flange portion 3b protruding from a side peripheral surface of the main body portion 3a, a bolt insertion hole 3c provided in the flange portion 3b, and a gas outlet 3d provided on the side peripheral surface of the main body portion 3a.

The retainer 10 includes a main plate portion 11 which is arranged so as to face the occupant side of a hub portion of a steering wheel. In a vicinity of a center of the main plate portion 11, an inflator opening 12 into which the inflator 3 is fitted is provided. A bolt insertion hole 13 into which a bolt 21 for fixing the air bag 2 and the inflator 3 to the main plate portion 11 is inserted is provided in a peripheral edge portion of the inflator opening 12.

In this embodiment, the module cover 40 has a canopy portion 41 which covers the occupant side of the folded body of the air bag 2 and a side wall portion 42 which protrudes from the canopy portion 41 toward an opposite occupant side. The side wall portion 42 has a frame shape surrounding the entire circumference of the folded body of the air bag 2.

On the 12 o'clock side of the retainer 10, a first mounting portion 14 (FIG. 2) for mounting the 12 o'clock side of the module cover 40 to the retainer 10 is provided. Second mounting portions 15 (FIG. 1) for mounting the 6 o'clock side of the module cover 40 to the retainer 10 are provided on the 4-5 o'clock and 7-8 o'clock sides of the retainer 10. The retainer 10 is provided with overhanging pieces 16 and 17 and the overhanging pieces 16 and 17 are respectively provided with horn contacts 16a and 17a. At the retainer 10, a mounting bolt 18 for connecting the retainer 10 to a base plate (not illustrated) is provided upright.

The mounting ring 20 has an annular shape which goes around the inflator opening 12 and the bolts (stud bolts) 21 are erected from four places in a circumferential direction.

Figure 2:
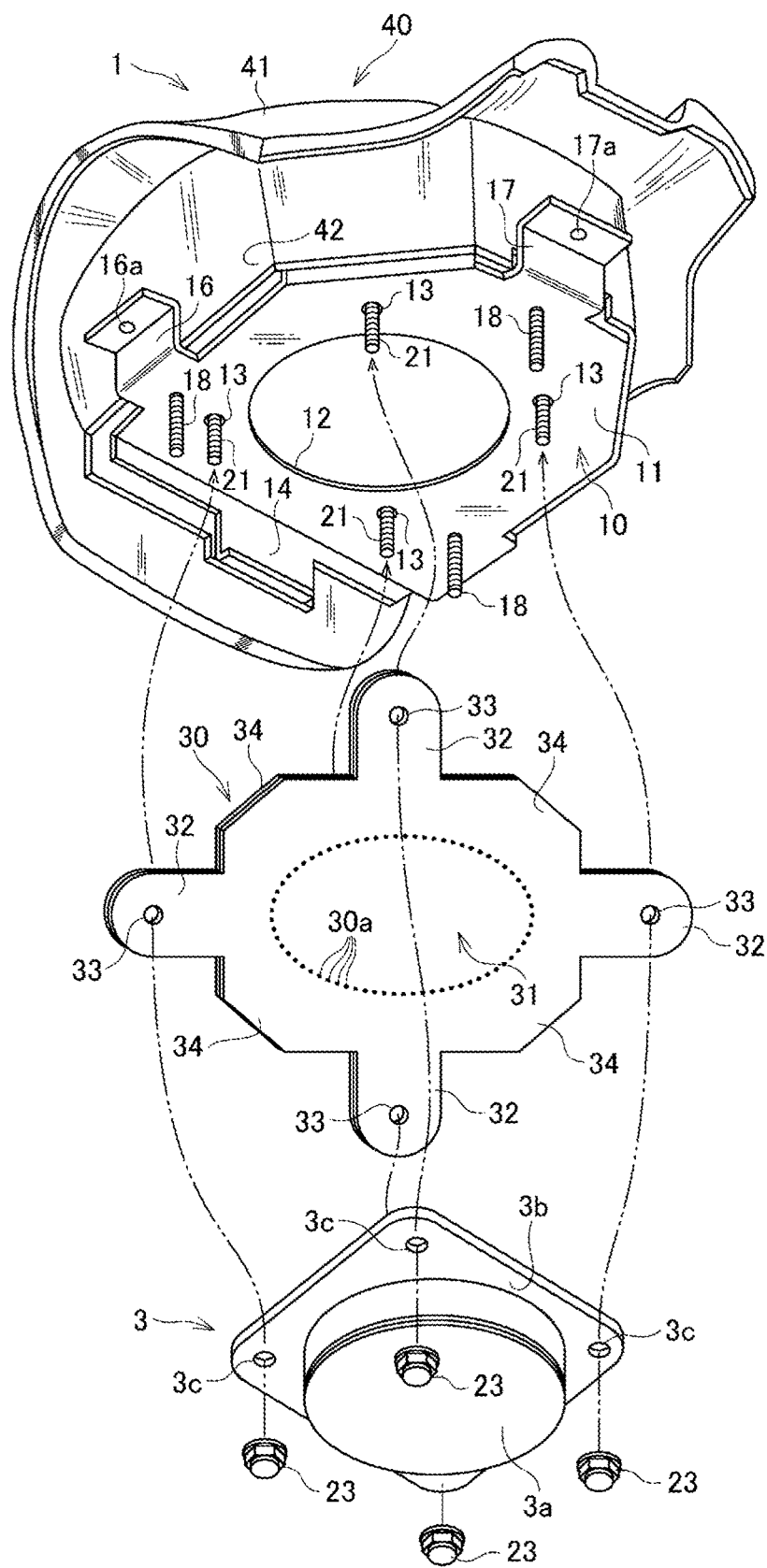
FIG. 2 is an exploded perspective view of the air bag device according to the embodiment.

In this embodiment, the diffuser 30 has a configuration in which two base fabrics are overlapped and sewn with a sewing thread 30a as illustrated in FIG. 2. The base fabric has a woven fabric of synthetic fibers such as polyester and a heat-resistant coating such as silicone resin formed on one surface of the woven fabric. The two base fabrics are overlapped so that non-coated surfaces without the heat-resistant coating are in contact with each other. The diffuser 30 may be formed of one base fabric having the heat-resistant coating on both sides. Three or more base fabrics may be overlapped and sewn. Also in this case, both outermost surfaces are surfaces having the heat-resistant coating.

The diffuser 30 includes a main surface portion 31, four leg piece portions 32 extending from the main surface portion 31 in four radial directions, a bolt insertion small hole 33 provided in each leg piece portion 32, and a flap portion 34 extending radially from the main surface portion 31 between the leg piece portions 32 and 32. The seam formed by the sewing thread 30a is provided in an annular shape on the main surface portion 31. The diameter of the annular seam is substantially equal to the diameter of the inflator opening 12.

Figure 3:
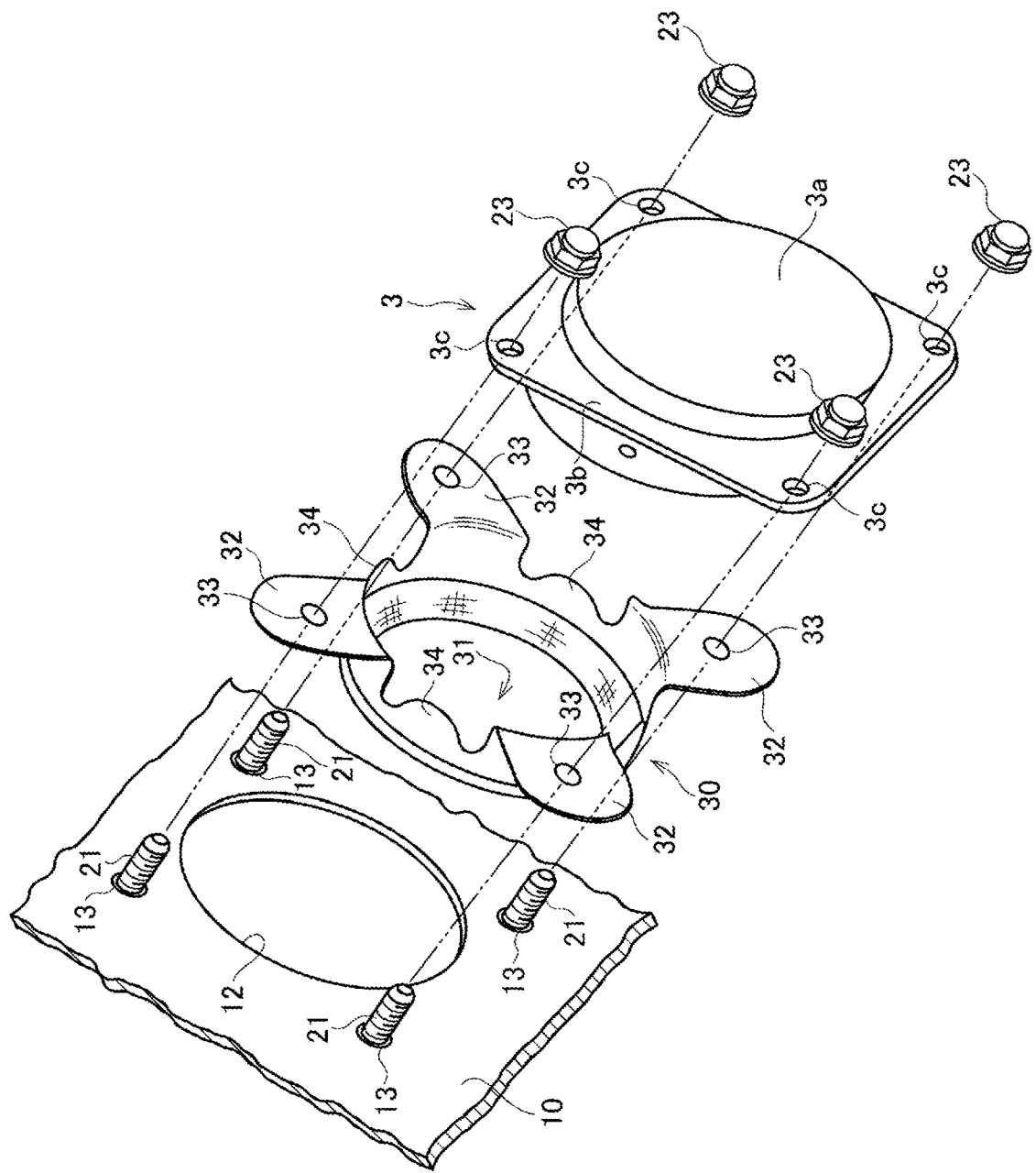
FIG. 3 is a partially exploded perspective view of the air bag device according to the embodiment.

As illustrated in FIGS. 2 and 3, the diffuser 30 faces the surface of the retainer 10 on the side opposite to the occupant and the bolt 21 of the mounting ring 20 is inserted into the bolt insertion small hole 33 of each leg piece portion 32, and further the main surface portion 31 is pushed into the opening 12. Either pushing the main surface portion 31 into the opening 12 or inserting the bolt 21 into the small hole 33 may be performed first.

The main surface portion 31 is preferably pushed into the folded body of the air bag 2 through the opening 12 and the mounting ring 20. Then, the head side of the inflator 3 is inserted into the opening 12 and each bolt insertion hole 3c is engaged with the bolt 21, and further a nut 23 is screwed into the bolt 21 to be tightened in such a manner that the air bag 2, the inflator 3, and the diffuser 30 are attached to the retainer 10.

The leg piece portion 32 of the diffuser 30 passes through the mounting ring 20 and the inflator opening 12, is bent at the edge of the inflator opening 12, and is interposed between the opposite occupant surface of the retainer 10 and the flange portion 3b of the inflator 3.

It is preferable that the tip of the flap portion 34 in the extending direction from the main surface portion 31 reaches the inflator opening 12 of the retainer 10.

The main surface portion 31 of the diffuser 30 covers the outer peripheral surface on the tip end side of the inflator 3 and the tip end surface thereof.

In the inflator 3, the gas outlet 3d on the side peripheral surface which is located further on the head side than the flange portion 3b is located inside the folded body of the air bag 2 rather than the mounting ring 20. The gas outlet 3d may face the leg piece portion 32, the flap portion 34, or the main surface portion 31. For example, the flap portion 34 may cover the gas outlet 3d so as to be in contact with the opening edge of the gas outlet 3d of the inflator 3.

Figure 4A:
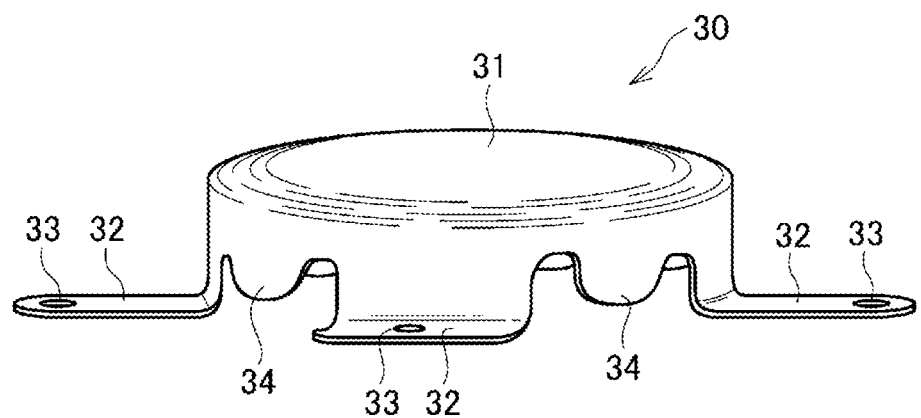
FIG. 4A is a perspective view illustrating a mounting shape of a diffuser and FIG. 4B is a perspective view of the diffuser when an inflator is operated.

FIG. 3 illustrates a state where the inflator 3 and the diffuser 30 are removed from the completed air bag device 1. FIG. 4A illustrates a state where the diffuser 30 in this state is viewed from the substantially lateral side.

Since the main surface portion 31 of the diffuser 30 is pushed by the inflator 3 and is pushed into the folded body of the air bag 2 through the opening 12 and the mounting ring 20, the main surface portion 31 is shaped like a cap following the head side of the inflator 3. The leg piece portion 32 is bent along the edge portion of the inflator opening 12 and thus is bent in an L shape.

The flap portion 34 hangs from the outer peripheral edge of the main surface portion 31 toward the inflator opening 12.

The air bag device 1 configured as described above is attached to the center of a steering of an automobile.

When the inflator 3 performs gas ejection operation in the event of a vehicle emergency, the air bag 2 is inflated and the canopy portion 41 of the module cover 40 is torn, and then the air bag 2 is deployed forward of the occupant's upper body and restrains the occupant.

Figure 4B:
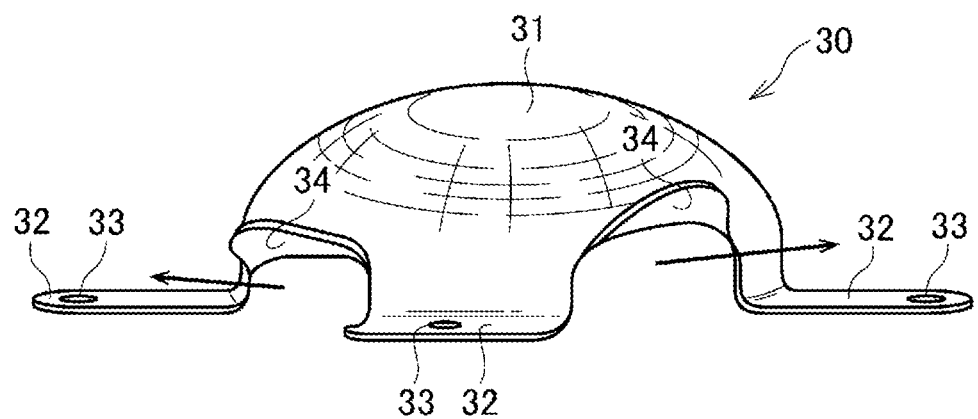
Figure 5:
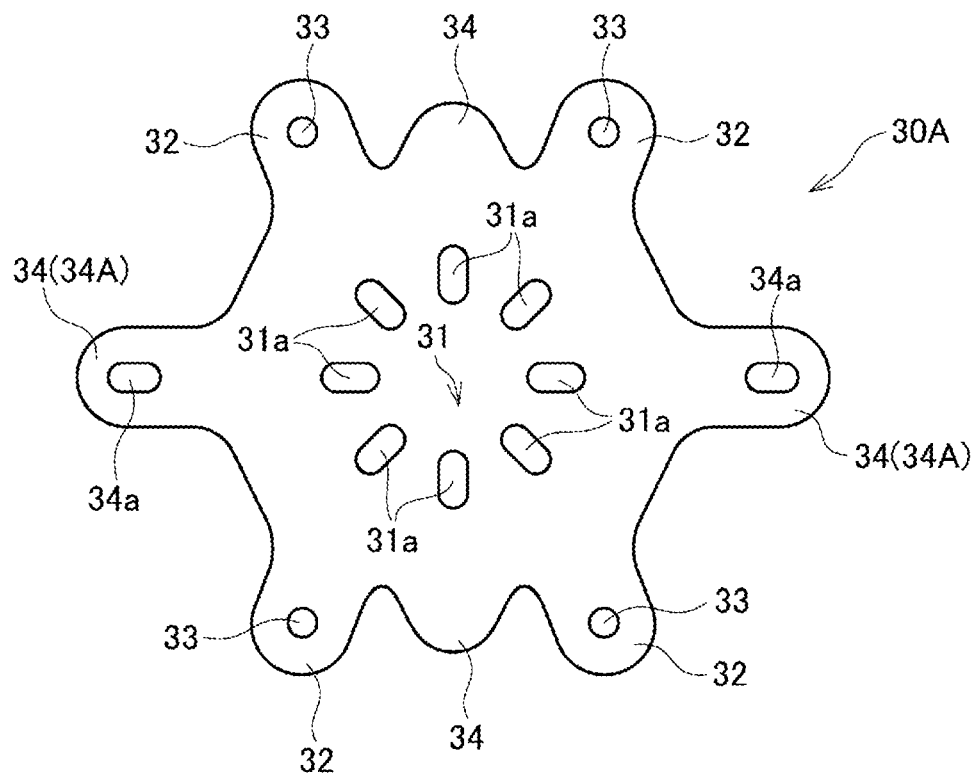
FIG. 5 is a plan view illustrating another shape of the diffuser.
Figure 6:
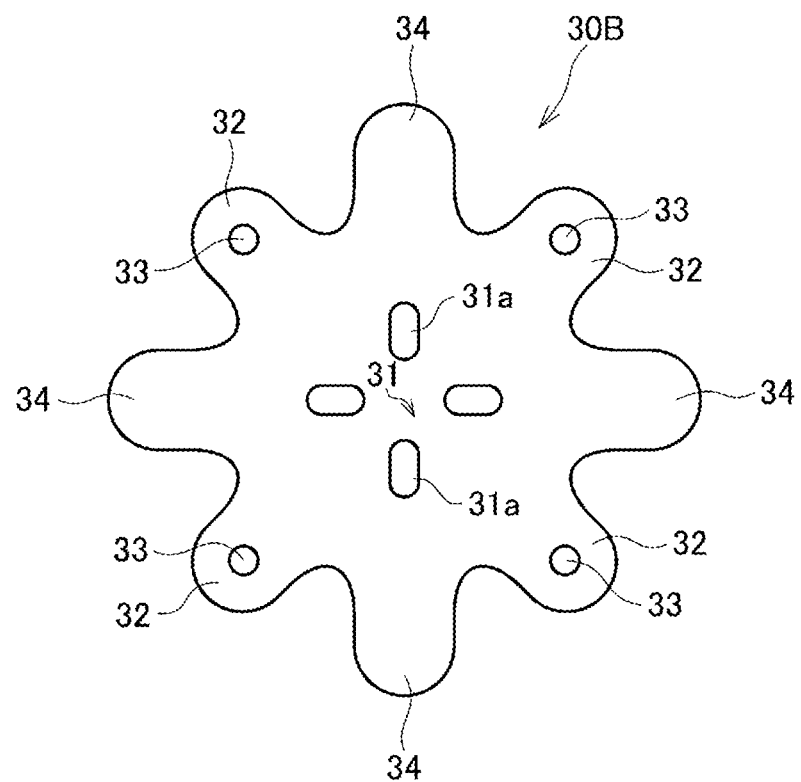
FIG. 6 is a plan view illustrating still another shape of the diffuser.
Figure 7:
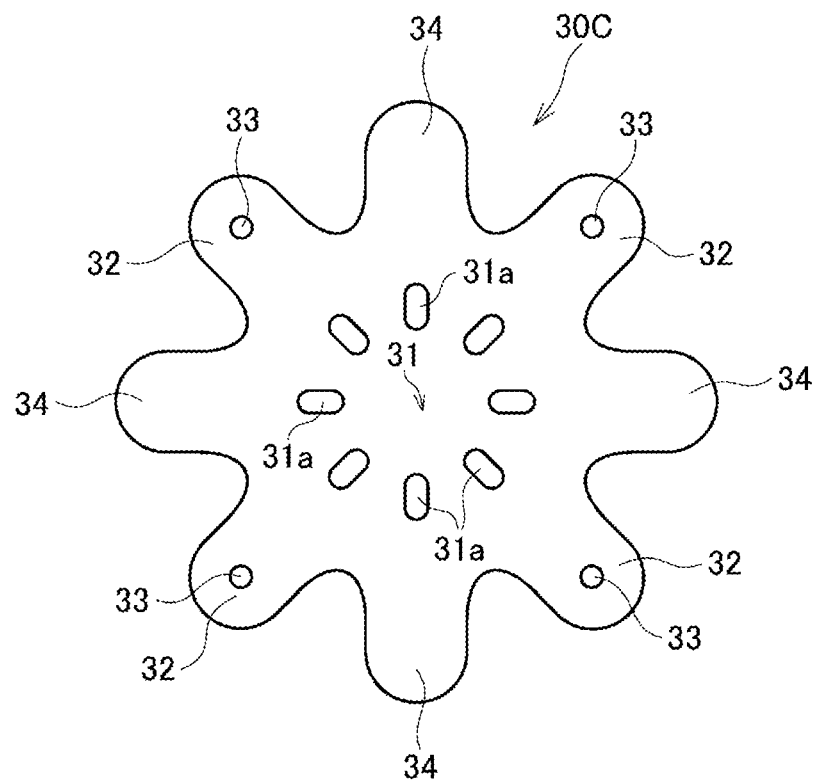
FIG. 7 is a plan view illustrating still another shape of the diffuser.
Figure 8:
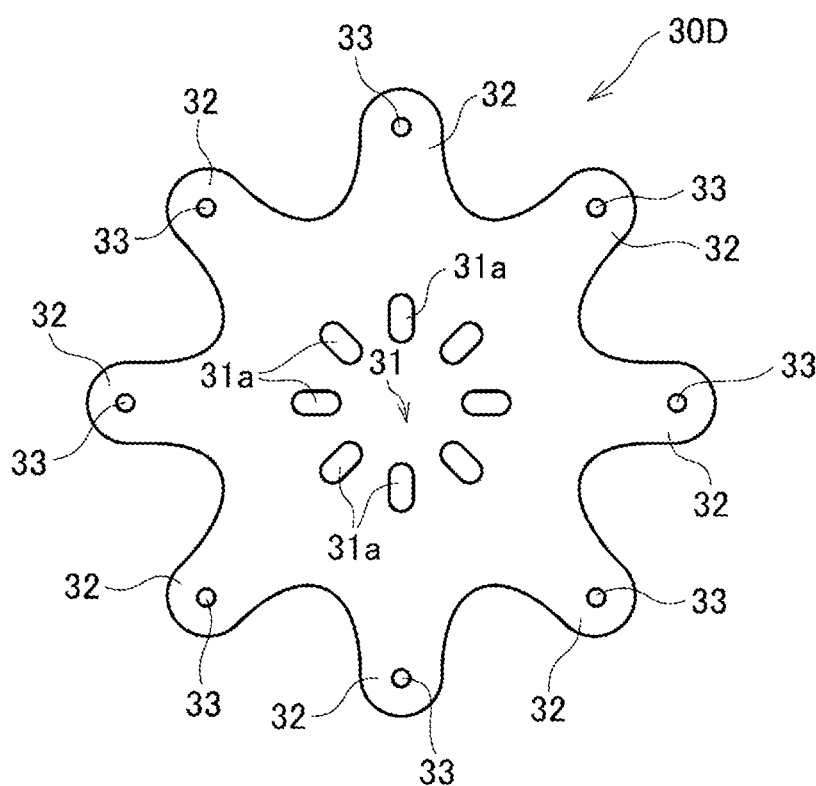
FIG. 8 is a plan view illustrating still another shape of the diffuser.

In this embodiment, the diffuser 30 is provided. Therefore, when the inflator 3 performs the gas ejection operation, the flap portion 34 of the diffuser 30 is pushed by the gas flow and protrudes to the lateral side as illustrated in FIG. 4B. Gas from the inflator 3 is ejected in four radiating directions from the portion between the leg piece portions 32 and 32. This causes the air bag 2 to expand quickly to the lateral side.

In this embodiment, to attach the diffuser 30 to the retainer 10 with the air bag 2 and the inflator 3, as illustrated in FIG. 2, in a state where the air bag 2 is engaged with the retainer 10 by the mounting ring 20, the bolt insertion small hole 33 of the diffuser 30 is passed through the bolt 21 from the opposite occupant side of the retainer 10 and the main surface portion 31 is pressed from the inflator opening 12 into the air bag 2. Next, the head side of the inflator 3 is inserted into the inflator opening 12 and the bolt 21 is passed through the bolt insertion hole 3d, and then the nut 23 is screwed and tightened. Thus, the diffuser 30, the air bag 2, and the inflator 3 are attached to the retainer 10. The operation of attaching the diffuser 30 is performed from the outside of the retainer 10, so that it is extremely simple.

Further, in this embodiment, the diffuser 30 has the non-coated surfaces of the two base fabrics overlapped with each other and the outward facing surfaces of the diffuser 30 are both heat-resistant coated surfaces. Therefore, the heat-resistant coated surface always faces the inflator 3.

In the embodiment, the configuration of the diffuser 30 in which the opening other than the bolt insertion small hole 33 is not provided and (almost) all of the gas from the inflator is ejected from the portion between the leg piece portions 32 and 32 is described. However, the invention is not limited to this. For example, a small gas passage opening may be provided in the main surface portion 31. Examples of different shapes of the diffuser are illustrated in FIGS. 5 to 8. In diffusers 30A to 30D illustrated in FIGS. 5 to 8, the main surface portion 31 is provided with a plurality of small gas passage openings 31a.

In the diffusers 30A to 30C, similarly to the diffuser 30, four leg piece portions 32 are provided and flap portions 34 are provided between the leg piece portions 32.

In the diffuser 30A, a pair of diametrically opposed flap portions 34 (34A) are longer than the other flap portions 34. The flap portion 34A extends through the inflator opening 12 outside the retainer 10 and outside an inflator flange portion 3b. The flap portion 34 is provided with a hole 34a. By visually checking that the tip of the flap portion 34A protrudes from the inflator flange portion 3b, it is confirmed that the diffuser 30A is mounted.

In the diffusers 30B and 30C, the length in the extending direction of each flap portion 34 is larger than the length in the extending direction of the flap portion 34. Also in this case, by visually checking that the tip of the flap portion 34 protrudes from the inflator flange portion 3b, it is confirmed that the diffusers 30B and 30C are mounted.

In the diffuser 30D, eight leg piece portions 32 are provided and the flap portion 34 is not provided. A total of four leg piece portion laminates are formed by overlapping two adjacent leg piece portions 32, and then the bolt 21 is inserted into the small hole 33 of each leg piece portion laminate.

The embodiment described above is an example of the invention and the invention may be applied to a form other than those illustrated in the drawings. For example, the diffuser may be formed by pressing a thin metal plate into the shape illustrated in FIGS. 3 and 4A.

In the present invention, a part of the opposite occupant side of the retainer 10, which is the portion where the leg piece portion 32 and the flap portion 34 overlap, is recessed by the thickness of the leg piece portion 32, in such a manner that the flange portion 3b of the inflator 3 may be closely overlapped with the retainer 10.

In the invention, the number of gas outlets 3d of the inflator 3 may be four. In this case, each gas outlet 3d may be arranged between the leg piece portions 32 and the flap portion 34 may be omitted.

The invention can be applied to air bag devices other than the driver's seat air bag device.

Although the invention has been described in detail with particular embodiments, it will be apparent to those skilled in the art that various modifications can be made without departing from the spirit and scope of the invention.

REFERENCE SIGNS LIST 1 air bag device
2 air bag
3 inflator
10 retainer
11 main plate portion
20 mounting ring
21 bolt
30, 30A to 30D diffuser
31 main surface portion
32 leg piece portion
34 flap portion
40 module cover

The invention claimed is:
1. An air bag device comprising:
an air bag,
an inflator configured to inflate the air bag,
a retainer to which the air bag and the inflator are attached by a mounting ring,
a diffuser configured to regulate a gas flow direction from the inflator; and
a module cover covering the air bag, wherein
the air bag and the retainer respectively has an inflator opening into which the inflator is inserted,
the mounting ring goes around the inflator opening in the air bag,
the mounting ring includes a plurality of bolts erected at intervals in a circumferential direction, each bolt is inserted into bolt insertion holes provided on the air bag, the retainer, and a flange of the inflator and a nut is screwed on the bolt, the diffuser includes a main surface portion covering the inflator, a plurality of leg piece portions extending from the main surface portion, and a bolt insertion small hole provided in the leg piece portion, the leg piece portion extends outside the air bag through the inflator opening of the retainer, and is interposed between the flange portion of the inflator and the retainer, and the bolt is inserted through the bolt insertion small hole.

2. The air bag device according to claim 1, wherein the diffuser does not include a gas passage opening.

3. The air bag device according to claim 2, wherein the plurality of leg piece portions include four leg piece portions which extend from the main surface portion in four radiating directions.

4. The air bag device according to claim 3, wherein the diffuser has a flap portion protruding from the main surface portion between the leg piece portions.

5. The air bag device according to claim 4, wherein a tip end of the flap portion reaches the inflator opening of the retainer.

6. The air bag device according to claim 4, wherein the flap portion is in contact with a gas outlet of the inflator.

7. The air bag device according to claim 6, wherein the flap portion protrudes to a lateral side when the inflator performs a gas ejection operation.

8. The air bag device according claim 7, wherein the diffuser is obtained by suturing a plurality of base fabrics.

9. The air bag device according to claim 8, wherein the diffuser is obtained by laminating two base fabrics each having a heat-resistant coating on one surface, with the other non-coated surfaces facing each other.

10. The air bag device according to claim 8, wherein the main surface portions of the diffuser are stitched together by an annular seam.

11. The air bag device according to claim 1, wherein the diffuser is formed of a single base fabric with a heat-resistant coating on both sides.

* * * * *